United States Patent [19]

Van Huyssteen

[11] Patent Number: 5,559,872
[45] Date of Patent: Sep. 24, 1996

[54] TELEPHONE TIME RECORDING SYSTEM

[75] Inventor: Alastair M. Van Huyssteen, Bellville, South Africa

[73] Assignee: Compu-Time (Proprietary) Limited, Bellville, South Africa

[21] Appl. No.: 333,857

[22] Filed: Nov. 3, 1994

[30] Foreign Application Priority Data

Nov. 5, 1993 [ZA] South Africa .................. 93/8277

[51] Int. Cl.$^6$ .................. H04M 15/00; H04M 11/00; H04M 1/64
[52] U.S. Cl. .................. 379/130; 379/131; 379/90; 379/73
[58] Field of Search .................. 379/34, 35, 73, 379/85, 67, 130, 131, 113, 90, 88, 100

[56] References Cited

U.S. PATENT DOCUMENTS

| | | | |
|---|---|---|---|
| 4,817,127 | 3/1989 | Chamberlin et al. | 379/67 |
| 5,142,564 | 8/1992 | Chu | 379/67 |
| 5,283,638 | 2/1994 | Engberg et al. | 379/90 X |
| 5,309,434 | 3/1994 | Maekawa | 379/34 X |
| 5,351,287 | 9/1994 | Bhattacharyya et al. | 379/35 X |

FOREIGN PATENT DOCUMENTS

| | | |
|---|---|---|
| 0003428 | 1/1979 | European Pat. Off. . |
| 0113693 | 1/1984 | European Pat. Off. . |
| 2048614 | 4/1980 | United Kingdom . |
| 2180122 | 3/1987 | United Kingdom . |

Primary Examiner—Wellington Chin
Assistant Examiner—Paul Loomis
Attorney, Agent, or Firm—Ladas & Parry

[57] ABSTRACT

A telephone time recording system is provided in which the opening part only of the voice communication that takes place during a telephone conversation is recorded, along with, amongst others, information relating to the total time of the call. The latter information may be generated as a synthesized speech and as such recorded on the same record medium as the opening part of the voice communication. The information recorded in this manner can later be used to identify the parties who participated in the call and the matter in question, and this can then be correlated with the information relating to the total time of the call, for billing purposes.

9 Claims, 2 Drawing Sheets

TELEPHONE TIME RECORDING SYSTEM

FIELD OF THE INVENTION

THIS INVENTION relates to a telephone time recording system. It also relates to a telephone instrument and a computer system which incorporates such a telephone time recording system.

BACKGROUND TO THE INVENTION

Many professional practices and other businesses bill a client or customer on the basis of the time that is spent on the client's or customer's matters. Much of this time is often spent on the telephone, and this is not always adequately recorded, if it is recorded at all.

Telephone time recording systems are available that record the duration of a telephone call and also the telephone number that was called. Although the record that is generated by such systems can readily be used by the user of the system to establish the cost of the call, ie the amount that he will be charged for the call by the provider of the telephone service, it does not lend itself to being used for billing purposes where the time spent by the person making or receiving the call should also be accounted for. Firstly, it is not possible from such a record to identify the individual persons who participated in the call. Secondly, it does not identify the subject matter of the call. Thirdly, a record is made of outgoing calls only. Incoming calls are left unrecorded.

Systems are also available in which a sound recording is made of the voice communication that takes place during a telephone call. The voice communication is recorded from beginning to end. An accurate record of the length of the call is not available unless it is made separately, in a system of the type described in the preceding paragraph, in which event it will be a cumbersome procedure to correlate the sound recording with the call duration record. Furthermore, a large amount of recording space and/or much retrieving time is required, making the use of such a system for billing purposes completely impractical.

OBJECTS OF THE INVENTION

It is an object of the present invention to provide a telephone time recording system which will provide a recording that will make it easy to capture, from the recording, the time spent on the telephone during various calls, and to link this information to the persons participating in each call and preferably also to the subject matter of each conversation. It is a further object of the invention to provide a system that can easily be integrated with the office equipment required for other purposes by most professional practices and other business concerns.

BRIEF DESCRIPTION OF THE INVENTION

According to the invention there is provided a telephone time recording system connectable to, or forming part of, a telephone instrument, the system comprising:

timing means for timing the duration of a telephone call made from or to the instrument;

signal generating means which is operable in response to the timing means to generate a time-related signal corresponding to said duration; and a sound recording device for making a sound recording, on a record medium, of voice communication taking place during part of the call;

the sound recording device being coupled to the signal generating means for making a recording, on the record medium, of the time-related signal.

In a preferred embodiment of the invention the arrangement is such that a recording is made of the opening part only of the voice communication taking place during the call.

The signal generating means may comprise a synthetic speech generator for generating the time-related signal as a synthesized speech signal, which synthesized speech signal is then recorded on the record medium upon termination of the call.

The signal generating means may further comprise data processing means for providing data corresponding to any one or more of the following:

(a) the number dialled when a call is made from the telephone instrument;

(b) the cost of the telephone call (ie the cost charged to the user by the telephone service provider);

(c) the date of the telephone call; and (d) the time of day of the telephone call; the synthetic speech generator being arranged to render this data in a voice synthesized form, for recordal on the record medium.

The data processing means may further include computing means to compute the amount for which the client or customer is to be billed, as a predetermined function of the duration of the telephone call.

The system may further comprise a switching arrangement for switching the sound recording device on and off at the requisite times. Thus, the switching arrangement may be operable:

(a) to switch the sound recording device on at the beginning of the call or a predetermined time period thereafter;

(b) to switch the sound recording device off a predetermined period after it was switched on;

(c) to switch the sound recording device on again at the end of the telephone call for recording of the synthesized speech signal; and (d) to switch the sound recording device off again after the synthesized speech signal has been recorded.

The switching arrangement may be operable to switch the sound recording device on when the handset of the telephone instrument is lifted; and to switch the sound recording device on again when the handset is put down for recording the synthesized speech signal.

The sound recording device may conveniently be in the form of a tape recorder. The tape recorder may make use of a tape cassette or other record medium of a type that is compatible with existing transcription equipment for transcribing dictation in the office of the person using the telephone time recording system. This will enable a secretary to listen to the tape cassette, identify the individual persons involved in each telephone call from the sound recording of the voice communication, and make a record of the recorded voice synthesized data for billing purposes.

Recordal of the time-related signal and other data referred to above on the record medium in a voice synthesized form will make it easy to transcribe all the information recorded on the record medium by means of the facilities already available for transcribing dictation (and that may in future become available for such purpose). It will be understood, however, that the data in question could also be recorded on, and retrieved from, the record medium in some other manner. For example, the sound recording device may be a digital recording device, the data in question being recorded in a digital form, in which event the equipment used for replaying the voice communication part of the recording could be provided with means for detecting and retrieving the digitally recorded part, and displaying the required information on a display screen.

The period of time for which a sound recording is made of the voice communication taking place during a telephone call need only be long enough to enable the individuals participating in the call, and preferably also the subject matter of the conversation, to be identified. As these details are often available from the opening remarks made during a call, the sound recording is preferably made of the first part of the telephone call. The arrangement may be such that the time period for which the sound recording is made can be adjusted to suit the needs of a particular person or environment. The period would typically be about 5 to 30 seconds. This will enable details of a large number of telephone calls to be recorded on a single cassette, and this number will to a large extent be independent of the duration of the various telephone calls, assuming that most of them will last longer than the period in question.

In telephone systems that have a keypad or other selector for dialling purposes, the system may include programming means to enable the user to program the data processing means by entering programming instructions via the selector. In this manner, for example, the timing schedule of the switching arrangement can be programmed according to the user's particular requirements.

Although, typically, one telephone instrument will be connected to the time recording system described above, it will be understood that more than one such instrument can be connected to the same time recording system. For example, where a person has both a normal telephone which operates through a private exchange (eg a P.A.B.X) as well as a private telephone, both the instruments can be connected to the same time recording system.

The system may include interface means for interfacing the system to an accounting facility thereby, for example, to permit direct debiting to the client's account.

The invention also extends to a computer system, for example a personal computer or the like, which includes a telephone time recording system as hereinbefore described. The invention further extends to a telephone instrument which includes a telephone time recording system as hereinbefore described.

BRIEF DESCRIPTION OF THE DRAWINGS

The invention will now be described in more detail, by way of example, with reference to the accompanying diagrammatic drawings, in which.

DETAILED DESCRIPTION OF THE DRAWINGS

Figure 1:
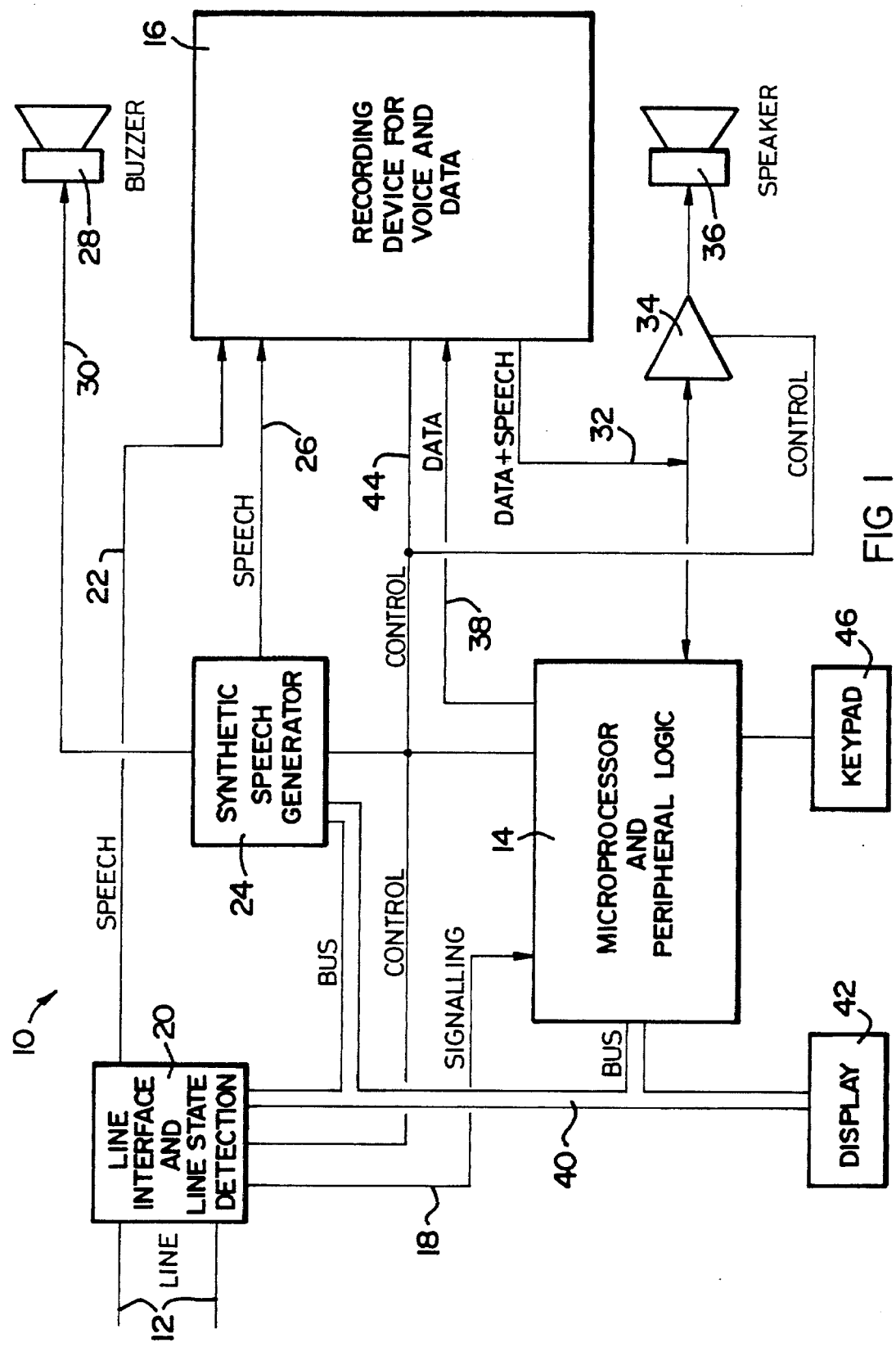
FIG. 1 is a simplified block diagram of a telephone time recording system in accordance with the invention.

Referring now to the drawing in more detail, reference numeral 10 generally indicates a telephone time recording system which is connected to a telephone line 12. The system comprises a microprocessor and peripheral logic section 14 and a sound recording device 16, such as a tape recorder, which operates under control of the microprocessor section 14. The microprocessor section 14 has an input 18 which is connected to the telephone line 12 via a line interface and line state detection section 20. A speech signal is fed from the line interface section 20 along a line 22 to the recording device 16. The microprocessor section 14 has timing means for timing the duration of a call made to or from a telephone instrument connected to the telephone line 12.

The system 10 further has signal generating means in the form of a synthetic speech generator 24 whose output is fed to the recording device 16 along a line 26, and to a buzzer 28 along a line 30. The purpose of the buzzer 28 is to give an audible signal (generated by the synthetic speech generator 24) to a user of the system 10, should this be desired. A data and speech line 32 leads from the recording device 16 to an input port of the microprocessor section 14 (for data) and via an amplifier 34 to a speaker 36. A data output line 38 leads from the microprocessor section 14 to the recording device 16. A system bus 40 connects the microprocessor section 14 to the line interface section 20, the synthetic speech generator 24, and a display 42. The microprocessor section 14 exercises control over the line interface section 20, the recording device 16, the amplifier 34 and the synthetic speech generator 24 via a control line 44. Finally the system comprises a keypad 46 for the entry of data to the microprocessor section 14.

In certain circumstances, the microprocessor and peripheral logic section 14 includes interface means for interfacing the system 10 to an accounting facility thereby, for example, to permit direct debiting to the client's account.

The microprocessor section 14 includes data processing means for providing data corresponding to any one, but preferably all, of the following:

a) the number dialled when a call is made from the telephone instrument;

b) the cost of the telephone call (ie the cost charged to the user by the telephone service provider);

c) the date of the telephone call; and d) the time of day of the telephone call.

The synthetic speech generator 24 renders this data available in voice synthesized form, for recordal by the recording device 16.

Advantageously, the data processing means further has computing means to compute the amount for which a client or customer is to be billed, as a predetermined function of the duration of the telephone call.

The microprocessor section 14 also has a switching arrangement which is operable:

a) to switch the recording device 16 on at the beginning of the call when the handset of the telephone instrument is lifted;

b) to switch the recording device 16 off a selectable pre-determined period after it was switched on;

c) to switch the recording device 16 on again at the end of the telephone call when the handset is put down for recording of the synthesized speech signal; and d) to switch the recording device 16 off again after the synthesized speech signal has been recorded.

Figure 2:
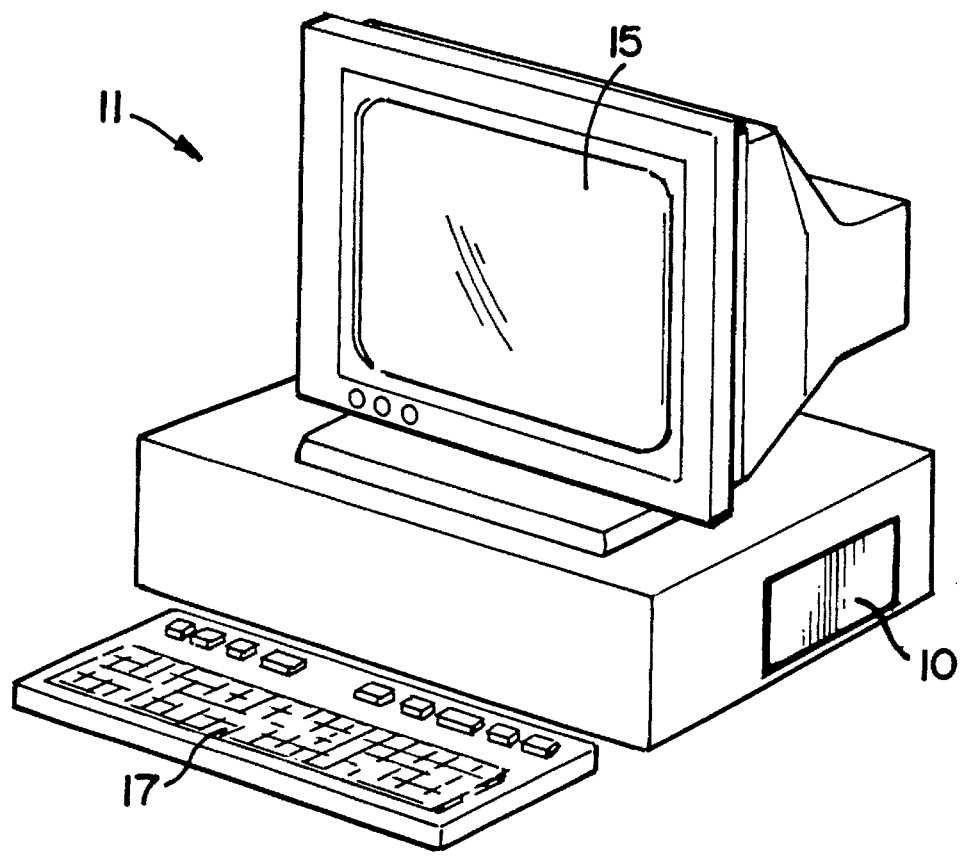
FIG. 2 is a three-dimensional view of a Personal Computer in accordance with the invention which includes the system of FIG. 1.

The system can be linked to a desktop computer (personal computer) designated 11, see FIG. 2, either as a separate unit or as an integral part thereof. Information regarding the time duration, telephone number, and cost of the telephone call can be fed to the PC 11 and, if desired, displayed on the PC's monitor 15, provision being made to input the name of the party and the matter in question. The secretary will then listen to each of the opening parts as previously recorded, and enter in the name of the party and the matter in question via the PC's keyboard 17, whereupon the entered data is then displayed with the other data already displayed on the monitor 15. The data relating to the call is thus completed by the information entered into the PC 11 and saved on the PC's digital mass storage device and/or a hard copy produced on a printer. The same can be achieved by storing the data and voice recording on a disc and then transferring it from the system to a PC with a built in loudspeaker. The same can also be achieved by producing the system in the form of a printed circuit board or dedicated card 10 which can be installed in a spare expansion slot (as shown in FIG. 2) of the PC 11 so that the system forms an integral part of the PC 11, to be linked to the telephone. The same in a somewhat different form can be achieved by means of voice recognition technology, capable of converting the voice communication directly into text. In the event that the voice recognition means employed is only able to recognise the voices of certain persons, only the voice of the professional person in whose office the system is located may be converted directly to text. This should provide sufficient detail to identify the other person and the matter in question.

Figure 3:
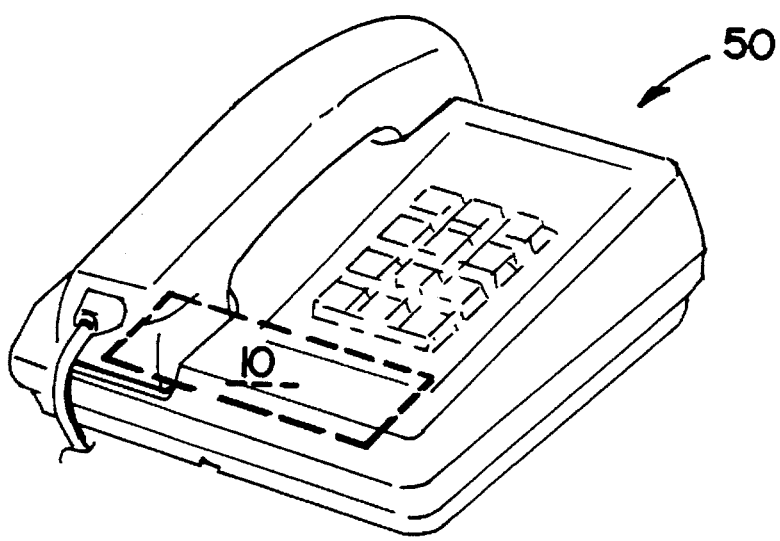
FIG. 3 shows a three-dimensional view of a telephone instrument in accordance with the invention which includes the system of FIG. 1.

The system 10 is in certain circumstances incorporated integrally within a telephone instrument 50 (see FIG. 3).

I claim:

1. A telephone time recording system connectable to a telephone instrument, the system comprising:

timing means for timing the duration of a telephone call made from or to the instrument;

signal generating means which is operable in response to the timing means to generate a time-related signal corresponding to said duration;

a sound recording device for making a sound recording, on a record medium, of voice communication taking place during the call;

the sound recording device being coupled to the signal generating means for making a recording, on the record medium, of the time-related signal, and a switching arrangement which is operable;

to switch the sound recording device on at the beginning of the call;

to switch the sound recording device off a pre-determined period after it was switched on whereby only the opening part of voice communication taking place during the call is recorded;

to switch the sound recording device on again at the end of the telephone call for recording of the time-related signal corresponding to said duration; and to switch the sound recording device off again after the time related signal corresponding to said duration has been recorded.

2. A telephone time recording system according to claim 1, in which the signal generating means comprises a synthetic speech generator for generating the time-related signal as a synthesized speech signal, which synthesized speech signal is then recorded on the record medium upon termination of the call.

3. A telephone time recording system according to claim 2, in which in the signal generating means further comprises data processing means for providing data corresponding to any one or more of the following:

(a) the number dialled when a call is made from the telephone instrument;

(b) the cost of the telephone call;

(c) the date of the telephone call; and (d) the time of day of the telephone call;

the synthetic speech generator being arranged to render this data in a voice synthesized form, for recordal on the record medium.

4. A telephone time recording system according to claim 3, in which the data processing means has computing means to compute the amount for which a client or customer is to be billed, as a predetermined function of the duration of the telephone call.

5. A telephone time recording system according to claim claim 1, in which the switching arrangement is operable to switch the sound recording device on when the handset of the telephone instrument is lifted; and to switch the sound recording device on again when the handset is put down for recording the time-related signal.

6. A telephone time recording system according to claim 3, which includes programming means for programming the data processing means.

7. A telephone time recording system according to claim 1, in which the sound recording device is in the form of a tape recorder.

8. A telephone time recording system according to claim 1, in which the sound recording device is a digital recording device.

9. A telephone time recording system according to claim 4, which includes interface means for interfacing the system to an accounting facility.

\* \* \* \* \*